(12) United States Patent
Kriese (10) Patent No.: US 7,337,581 B2
(45) Date of Patent: Mar. 4, 2008

(54) GUIDE ASSEMBLY FOR SLIDING DOORS OR PIVOTABLE SLIDING DOORS OF VEHICLES AND SLIDING DOOR OR PIVOTABLE SLIDING DOOR

(75) Inventor: Olaf Kriese, Lautertal (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 362 days.

(21) Appl. No.: 10/925,124

(22) Filed: Aug. 24, 2004

(65) Prior Publication Data

US 2005/0044794 A1  Mar. 3, 2005

(30) Foreign Application Priority Data

Aug. 25, 2003  (DE) ................................ 103 39 347

(51) Int. Cl.
   *E05F 11/54* (2006.01)
(52) U.S. Cl. ............................ 49/360; 296/155; 49/358
(58) Field of Classification Search ................ 49/358, 49/360, 352, 213, 216, 221, 218, 219, 208, 49/209; 296/155
   See application file for complete search history.

(56) References Cited

U.S. PATENT DOCUMENTS

| | | | | |
|---|---|---|---|---|
| 2,553,511 A | * | 5/1951 | Casey, Sr. ..................... | 49/358 |
| 3,913,268 A | * | 10/1975 | Paterson ....................... | 49/220 |
| 4,095,371 A | * | 6/1978 | Knippel ........................ | 49/352 |
| 4,593,793 A | * | 6/1986 | Salmon ......................... | 49/349 |
| 4,781,270 A | * | 11/1988 | Holland ........................ | 187/324 |
| 4,862,640 A | | 9/1989 | Boyco et al. .................. | 49/213 |
| 4,887,390 A | | 12/1989 | Boyko et al. .................. | 49/214 |
| 5,282,663 A | | 2/1994 | Horton ......................... | 296/155 |
| 5,967,595 A | | 10/1999 | Heya et al. ................... | 296/155 |
| 6,038,818 A | | 3/2000 | Haag et al. .................... | 49/360 |
| 6,517,365 B1 | | 2/2003 | Bungo et al. ................. | 439/162 |
| 6,553,719 B1 | * | 4/2003 | Stone et al. .................. | 49/358 |
| 6,814,394 B2 | * | 11/2004 | Yogo et al. ................... | 296/155 |

FOREIGN PATENT DOCUMENTS

DE          196 32 427 A1       2/1998

OTHER PUBLICATIONS

European Search Report, Application No. EP 04 10 2988, dated Nov. 29, 2006.

* cited by examiner

*Primary Examiner*—Jerry Redman
(74) *Attorney, Agent, or Firm*—Renner, Otto, Boisselle & Sklar, LLP (57) ABSTRACT

Guide assembly for sliding doors or pivotable sliding doors for vehicles having at least one door displaceably supported at the vehicle by means of connecting members disposed vertically above each other. The guide assembly includes: upper guide means and lower guide means, each cooperating with a respective connecting member at least during displacement of the door; at least one flexible traction means; and at least an upper and a lower deflecting means to be mounted on the door, each engaging with the at least one traction means for deflecting said traction means. The traction means can be mounted on vehicle wall by upper and lower traction means holding portions, wherein each traction means holding portion can be mounted on said vehicle wall. The invention further relates to sliding door or pivotable sliding door comprising the guide assembly and an electric motor for driving the door.

15 Claims, 7 Drawing Sheets

GUIDE ASSEMBLY FOR SLIDING DOORS OR PIVOTABLE SLIDING DOORS OF VEHICLES AND SLIDING DOOR OR PIVOTABLE SLIDING DOOR

TECHNICAL FIELD

The present invention relates to a guide assembly or apparatus for sliding doors or pivotable sliding doors of vehicles as well as to a sliding door or pivotable sliding door, and relates in general to a guide assembly or apparatus and a guide and drive principle for such vehicle doors.

RELATED ART

Figure 1:
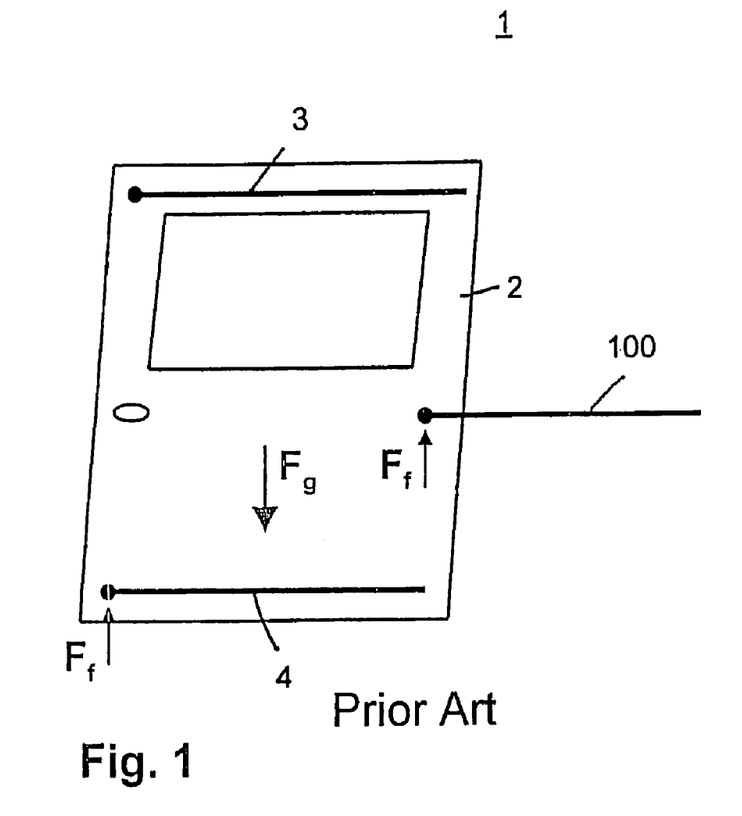
FIG. 1 is a schematic view of a guide apparatus with a sliding door according to the prior art.

FIG. 1 shows a guide assembly for a sliding door with a conventional three-point guide according to the prior art. The guide assembly 1 comprises an upper guide rail 3, a lower guide rail 4 and a middle guide rail 100, which is disposed behind the upper and lower guide rail, respectively, as viewed in longitudinal direction of the vehicle. Lever-type connecting members (not shown) are fixedly mounted on the door 2. The connecting members engage with the upper and lower guide rail 3, 4. A roll carriage comprising a pair of rollers engages with the middle guide rail 100. The connecting members or the pair of rollers engage with the respective guide rail 3, 4 or 100 in the areas highlighted by solid dots.

As shown in FIG. 1, the weight of the door 2 is supported exclusively by the lower guide rail 4 and the middle guide rail 100, as indicated by the two arrows Ff. For preventing tilting of the door 2 in longitudinal direction, two supporting portions, which are indicated by the arrows Ff and where the weight Fg of the door 2 is supported, are provided in a manner displaced relative to each other substantially by the width of the door 2 in longitudinal direction of the vehicle so that a comparatively long lever is provided.

According to the prior art the middle guide rail 100 is provided on the outer wall of the vehicle behind the door opening to be closed by the door, as viewed in longitudinal direction of the vehicle. A middle guide rail 100, which represents an essential element of the outer vehicle body, is clearly visible. This results in serious limitations in the design of vehicle bodies.

Furthermore, according to the prior art it is difficult to integrate a drive unit for opening and closing the door by means of an electric motor in a door module to be received by the door. Furthermore, according to the prior art it is difficult to separate the drive elements for opening and closing the door from guide means for guiding the door. All this results in serious limitations in the design and configuration of vehicles with sliding doors or pivotable sliding doors.

U.S. Pat. No. 5,967,595 discloses a guide assembly for sliding doors, comprising an upper guide rail, a lower guide rail and a middle guide rail, which is fixed at the inner side of the door. For counteracting a tilting of the door in the opened position of the door, supporting points of the door are displaced relative to each other also in the opened position.

U.S. Pat. No. 6,038,818 discloses a drive mechanism for driving a sliding door of a motor vehicle. Guide rails are mounted on the vehicle body at the upper and lower edge, respectively, of the door opening. A respective roller or wheel, which is fixedly connected with the sliding door, is guided in a respective guide rail. The drive mechanism comprises a drive unit disposed at a rear end of the sliding door. The drive unit is coupled with a cable. The cable runs, beginning at the drive unit, towards the front end of the sliding door, is guided towards a guide sleeve mounted on the vehicle body and is guided from there back towards the drive unit by means of deflecting pulleys or rollers. The only function of the cable is to drive the door. Securing the cable is relatively complicated.

DE 196 32 427 A1 discloses a guide apparatus for pivotable sliding doors of busses. A flexible traction means is attached at the inner side of the door and deflected by means of an upper and lower deflecting means fixedly mounted on the door. The deflecting means engage with the at least one traction means for deflecting the traction means. A drive unit for opening and closing the door, which comprises an electric motor, is coupled with the traction means. The only function of the traction means is to drive the door.

The weight of the door is supported at the upper and lower guide rails. For preventing tilting of the door, the door is additionally supported at a relatively stable vertical rotary column.

This guide apparatus for busses is relative complicated and cannot be implemented easily for small motor vehicles, in particular automobiles and vans.

SUMMARY

It is an object of the present application to provide a guide assembly or apparatus for sliding doors or pivotable sliding doors of vehicles, in particular motor vehicles, which enables new design principles in the design of motor vehicles and enables new drive and guide principles. Furthermore, a corresponding sliding door or pivotable sliding door is to be provided.

According to the present invention there is provided a guide assembly or apparatus for sliding doors or pivotable sliding doors of vehicles, comprising at least one door that is supported in a slidable and/or pivotable manner at the vehicle by means of connecting members disposed vertically above each other, said guide assembly or apparatus comprising an upper guide means and a lower guide means, a respective connecting element cooperating with said guide means at least while said door is displaced, at least one flexible traction means and at least one upper deflecting means and at least one lower deflecting means respectively mountable on said door, said deflecting means engaging with said at least one traction means for deflecting said traction means. According to the present invention a respective traction means of the guide assembly or apparatus can be mounted on or supported at the vehicle wall by means of upper and lower traction means holding portions respectively mountable on said vehicle wall.

Whereas the weight of the door is supported essentially only by the lower and/or upper guide rail, according to the present invention the moment of tilt, which results from the weight of the door, can be absorbed by the flexible traction means and transferred to the traction means holding portions that are mounted on the vehicle wall. It is an advantage of the present invention that an additional third guide rail, which is usually provided on the outer wall of the vehicle according to the prior art, is not necessary anymore for supporting the door. This enables new possibilities in the design of vehicles having sliding doors or pivotable sliding doors. E.g. the rear portion of a car body can be designed in a completely different manner, because according to the invention it is not necessary anymore to integrate an additional third guide rail into the outer wall of the car body.

According to the invention, it is a function of the traction means, on the one hand, to transfer forces that result from the moment of tilt of the door to the traction means holding portions mounted on the car body and, on the other hand, to support the door for counteracting the moment of tilt resulting from the weight of the door. The deflecting means, which engage with the at least one traction means, are provided essentially for supporting the door at the traction means. Preferably, the deflecting means are disposed at the front edge portion of the door, preferably in proximity to the upper and lower front corner respectively of the door, so that the door can be supported efficiently against tilting even in its opened position.

For supporting the door even more efficiently, it may be preferred that the traction means cannot be stretched or elongated substantially along a longitudinal axis thereof. Any stretching or elongation of the traction means may be absorbed by tensioning means or compensation means.

According to the present invention, it is a function of the traction means holding portions to fix the flexible traction means so that end portions or reversal portions of the traction means near the traction means holding portions can be maintained essentially unchanged in any position of the door. Thus, the traction means embodies a guide, which is anchored relative to the car body in a fixed manner but is, nevertheless, flexible and along which the door can be moved while being secured against tilting of the door.

According to an embodiment, a respective traction means can be bent or flexured around at least one transverse axis of the vehicle. According to another embodiment, the traction means can be bent or flexured around all directions in space. For this purpose the traction means may be a cable, in particular a rope, a chain, a link chain, a bead chain, a belt, or may be formed in a similar manner. It may be preferred that the deflecting means engage with the at least one traction means in a friction-tight manner. However, irregularities or protrusions of the traction means, e.g. links or joints of the chain, protrusions of the belt or the like, can be utilized for a positive fitting (form-fitting) engagement of the deflecting means with the at least one traction means.

In general the traction means can be formed as an endless traction means, in which case it may be preferred that the running direction of the traction means is essentially reversed at the associated traction means holding portions. Such an endless traction means can be statically fixed at the traction means holding portions.

As an alternative such an endless traction means could also be supported in a movable manner. E.g. a deflecting means for deflecting a cable, in particular a rope, serving as a traction means, fixed at a traction means holding portion, might enable guiding the cable or rope in an endless and revolving manner. With such an embodiment the respective deflecting means can be connected with the traction means at the deflecting regions. Driving the traction means enables opening or closing of the door. Accordingly, such an alternative embodiment substantially relies on the principle of a kind of kinematics reversal of the principle described above, according to which respective end portions of the traction means are mounted or fixed on the vehicle body.

According to a preferred embodiment, the traction means comprises, however, two ends, which are mounted or fixed on the vehicle body wall at the traction means holding portions. For mounting or fixing the traction means, any frictional fixing technique, positive-fit fixing technique or welding or bonding can be utilized. Conveniently, a cable, in particular a rope, which serves as a traction means, is mounted on the vehicle wall by means of holding lugs or eyes, by means of connections for fixing the cable or rope, welding dots or the like.

According to another embodiment, the traction means holding portions, which are displaced relative to each other in a vertical direction, are displaced relative to each other in the horizontal direction, i.e. in the longitudinal direction of the vehicle, by at least a maximum displacement distance of the door. Accordingly, the door can be supported efficiently on the traction means in any position between the fully opened position and the fully closed position.

In general, according to the present invention it can be sufficient to provide only two deflecting means for deflecting the at least one traction means, i.e. an upper and a lower deflecting means. More preferably, however, the upper and lower deflecting means each comprises at least two deflecting means or a pair of deflecting members, which are displaced relative to each other along the transverse axis of the vehicle. Preferably, the respective traction means is deflected by the upper and lower deflecting means, which is respectively disposed closest to the vehicle wall, in opposite directions. E.g., if the traction means is deflected clockwise in the upper region of the door, if viewed from above on the deflecting means, then the traction means in the lower region of the door is deflected counterclockwise, if viewed from above on the deflecting means. Thus, moments of tilt, which result from the weight of the door, can be absorbed and transferred by the at least one traction means even more symmetrical.

According to another embodiment, the pair of deflecting elements mentioned above can be mounted on a connecting element associated therewith in such a manner that a traction means is guided essentially along the connecting element. For this purpose, it may be preferred that the deflecting means are fixed or mounted on the respective connecting element at dot-like mounting portions.

Preferably the deflecting means engage with a respective traction means in such a manner that the respective traction means is guided in a substantially z-shaped manner at least in an opened or closed position of the door, where the largest moments of tilt act on the door. A substantially z-shaped run of the traction means is of advantage, because the upper and lower deflecting means can then deflect the traction means by a relatively large angle and because the door can then be supported even more efficiently due to a maximum resistance, e.g. caused by the friction or stretching forces or by the deformation resistance acting when the run of the traction means is deformed.

In the region of a respective deflecting means the traction means is preferably deflected by an angle in the range between approximately 80° and approximately 100°. More preferably the traction means is deflected in a respective deflection area by an angle different from 90°, e.g. by 95° or 85°, so that the upper deflecting means is disposed behind the lower deflecting means, if viewed in the longitudinal direction of the vehicle.

According to a further embodiment, the guide assembly or apparatus comprises two traction means that run at least partially in opposite directions and that are tensioned or biased against each other. E.g. the two traction means can run in the car body at an upper and lower edge, respectively, of the door opening in substantially opposite directions, but can be deflected by two identical deflecting means, e.g. deflecting pulleys, in opposite directions. As the traction means runs are tensioned or biased against each other, the door can be supported even more efficiently. Furthermore, the moment of tilt can be absorbed by the traction means even more efficiently.

In order to avoid that a respective traction means sloughs off from the deflecting means or is lost as the respective traction means slides along the deflecting means while the door is displaced, the deflecting means preferably comprise a seat formed in correspondance with a profile of the associated traction means for receiving the associated traction means therein. E.g. in the case of a cable, in particular a rope, which serves as a traction means, a guide groove for guiding the cable could be provided on the outer circumference of a deflecting pulley.

According to another embodiment, the connecting members each comprise at least one joint for joining the door to the vehicle wall or to a guide means disposed therein in an articulated manner. Thus, the guide means can also comprise portions that are curved or bent inwardly towards the vehicle or outwardly away from the vehicle in order to guide the door additionally towards the vehicle or away from the vehicle during displacement of the door along the longitudinal axis of the vehicle.

According to another embodiment the connecting members are formed as levers that support an articulated engaging member for engaging with the upper and lower guide means, respectively, at an end of the lever turned away from the door. The engaging member is preferably formed in correspondence to a profile of the guide means so that the door can be guided by the guide means substantially without play. If the guide means is formed e.g. as a guide rail having a longitudinal receptacle, the engaging elements can be formed as a pair of rollers, which are movably supported in the longitudinal receptacle, or as a sliding member, which is received in the longitudinal receptacle in a slidable manner. Due to the articulated support of the engaging member at the connecting member the engaging member can be moved further easily even while engageing with the portions curved or bent inwardly towards the vehicle or outwardly away from the vehicle.

Preferably guide rails are disposed at the upper and/or lower edge of the door, each comprising a curved portion at a rear end thereof. An engaging member supported by a pivot lever, which is fixedly mounted on the vehicle wall and is supported pivotably, can engage with such a guide rail for additionally guiding the door during displacement and/or swinging. It is to be appreciated that this feature is turning away from the conventional guide principle, according to which a pivot lever having a roller carriage is always mounted fixedly on the door.

Preferably the above guide assembly or apparatus is assembled in advance in such a manner that a complete vehicle door or a door module, which is to be received by a vehicle door, is provided with a complete guide assembly or apparatus and/or with a traction means system so that it is only necessary to connect the elements of the guide assembly or apparatus and/or of the traction means system with the vehicle body in a suitable manner.

According to another embodiment the traction means or traction means system is coupled with a drive unit for displacement and/or swinging or swivelling the door relative to the vehicle wall. Preferably, the drive unit is directly mounted on the door or on the pre-assembled door module to be received by the door. Thus, the door or the door module can be assembled in advance completely, can be supplied together with its own drive unit and can be mounted on the vehicle. Thus, this feature enables novel drive principles for displacing and/or swinging or swivelling vehicle doors by means of an electric motor.

Preferably, a driven member of the drive unit engages with the traction means or traction means system in a form-fitting manner or friction-tight manner. Even more preferably, the drive unit comprises a cable or rope drum, around which a respective traction means is wound. When the cable or rope drum is rotated, it unrolls the respective traction means or winds the traction means up.

According to a further aspect of the present invention, there is also provided a sliding door or a pivotable sliding door for vehicles, in particular motor vehicles, comprising a guide assembly or apparatus as described above.

According to a further aspect, the present invention relates to a guide assembly for sliding doors or pivotable sliding doors of vehicles comprising at least one door that is supported at the vehicle slidably and/or pivotably by means of connecting members disposed above each other in a vertical direction, said guide assembly comprising an upper guide means and a lower guide means cooperating with a respective connecting member at least while said door is displaced, at least one flexible traction means and at least an upper deflecting means and a lower deflecting means respectively mounteable on the door, said deflecting means engaging with said at least one traction means for deflecting said traction means. According to the present invention, a respective traction means is mounted on or supported at the vehicle wall by means of upper and lower traction means holding portions mounted at the vehicle wall.

BRIEF DESCRIPTION OF DRAWINGS

In the following the invention will be described in an exemplary manner and with reference to the accompanying drawings, from which further features, advantages and objects can be concluded and wherein.

DETAILED DESCRIPTION

Throughout the drawings identical reference numerals relate to elements or groups of elements that are identical or function in a substantially equivalent manner.

Figure 2:
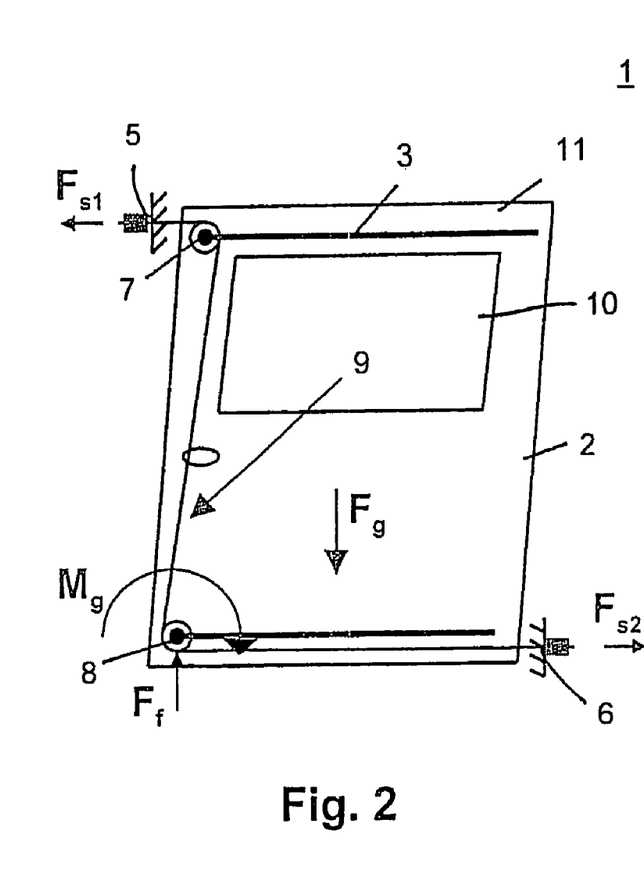
FIG. 2 is a schematic view of a guide apparatus with a sliding door according to the present invention.

FIG. 2 is a schematic view of a guide apparatus or assembly (hereinafter: guide apparatus) according to the present invention having a sliding door. The guide apparatus 1 comprises an upper guide means 3 and a lower guide means 4 for guiding the door 2. The guide means 3, 4, which are formed e.g. as guide rails (compare FIG. 6), guide the movement or displacement of the door 2 such that a play in a direction transverse to the longitudinal axis of the vehicle, i.e. in FIG. 2 perpendicular to the drawing plane, can be neglected in practice. By moving or displacing the door 2 along the longitudinal axis of the vehicle or by displacing and swinging or swivelling the door 2 in the direction of a transverse axis of the vehicle, the door opening can be opened or closed.

The guide apparatus 1 further comprises a cable or rope 9, which serves as a traction means. In the illustrated embodiment both ends of the cable or rope 9 are mounted on the vehicle wall at the upper mounting portion 5 and the lower mounting portion 6. For this purpose suitable holding members or anchoring members are disposed at the vehicle wall, optionally with an associated tensioning means for tensioning the cable or rope 9. As shown in FIG. 2 the cable 9 is guided in a substantially z-shaped manner. For guiding the cable 9 an upper deflecting pulley 7, which serves as an upper deflecting means, and a lower deflecting pulley 8, which serves as a lower deflecting means, are attached at the door 2 in the upper and lower region, respectively, of the door 2. The deflecting pulleys 7, 8 guide the cable or rope 9 and deflect forces, which act on the cable or rope 9, to another direction in space, as described below. For reliably guiding the cable 9, a guide groove that matches to the profile of the cable 9 is respectively provided in the deflecting pulleys 7, 8.

As shown in FIG. 2, the deflecting pulleys 7, 8 are displaced relative to each other in a vertical direction and are also displaced in the illustrated embodiment in a horizontal direction although this is not absolutely necessary. According to FIG. 2, a projection of the upper deflecting pulley 7 onto the lower guide rail 4 overlaps with the lower guide rail 4. Referring to FIG. 2, the deflecting pulleys 7, 8 are mounted at the left edge of the door 2. Thus, the cable 9 leaves the upper edge 11 of the door 2 and extends substantially parallel to the window 10 and spaced apart to the window 10 downwardly towards the lower deflecting pulley 8. The position of the mounting portions 5, 6 and of the deflecting pulleys 7, 8 is chosen such that the cable or rope 9 runs along an upper and lower edge, respectively, of the door 2 substantially parallel to the upper and lower guide rail 3, 4, respectively, in any position of the door 2.

Of course, the positions of the directing pulleys 7, 8 can also be varied. Furthermore, additional deflecting pulleys can be provided for suitable guiding the cable or rope 9. It is to be noted that the cable or rope 9 is suitably guided around the window 10 and members, e.g. a window regulator, received in the door 2.

As shown in FIG. 2, the weight Fg of the door 2 is absorbed exclusively by the upper and/or lower guide rails 3, 4. For this purpose respective connecting members that are mounted on the door 2 and/or to the vehicle wall engage with guide rails or similar guide means mounted on the vehicle wall and/or the door 2.

As shown in FIG. 2, a moment of tilt Mg, which results from the weight Fg of the door 2, acts on the lower deflecting pulley 8 and attempts to tilt the door 2 around an axis intersecting the drawing plane perpendicularly. A corresponding moment of tilt also acts on the upper deflecting pulley 7. As the deflecting pulleys 7, 8 are supported by the tensioned cable or rope 9, a load moment or counteracting moment counteracts the moment of tilt resulting from the weight of door. Thus, the moment of tilt is absorbed by the cable or rope guide.

Figure 3A:
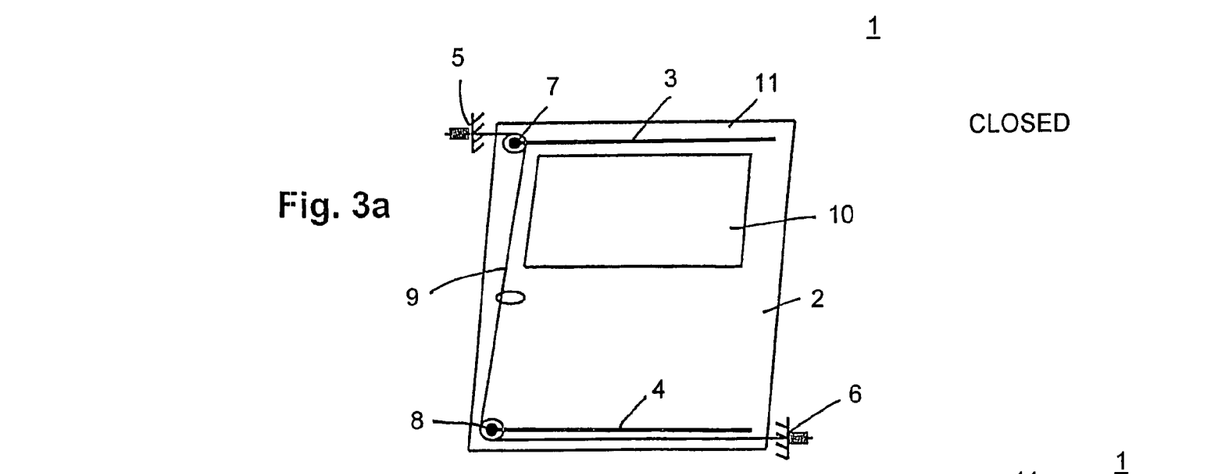
FIGS. 3a and 3b are schematic views of the sliding door according to FIG. 2 in a closed position and an opened position, respectively.
Figure 3B:
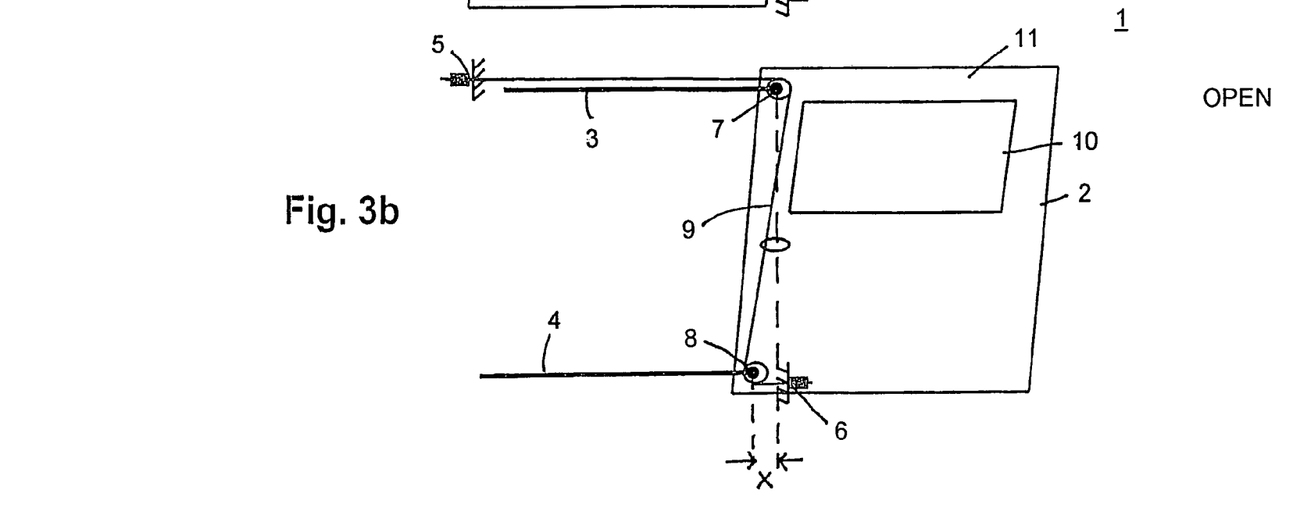

FIGS. 3a and 3b are schematic views of the sliding door according to FIG. 2 in a closed position and an opened position, respectively. As shown in FIGS. 3a and 3b, the door 2 is opened by displacement to the right or to the rear end of the vehicle (not shown). During displacement the connecting members not shown (compare FIG. 6), which are fixedly connected with the door 2, cooperate with the upper and lower guide rail 3, 4 for supporting the weight of the door 2. When the door 2 is displaced, the cable or rope 9 is guided by the upper and lower deflecting pulleys 7, 8 mounted on the door 2. The z-shaped configuration of the cable is maintained in any position of the door 2. According to FIGS. 3a and 3b, the upper and lower deflecting pulleys 7, 8 are displaced to each other by a distance x in a horizontal direction. The substantially parallel run of the cable or rope 9 at the upper and lower edge of the door 2 towards the upper and lower guide rail 3, 4, respectively, is clearly visible. Preferably, the cable or rope 9 extends above and below the upper and lower guide rail 3, 4, respectively, e.g. within an interior cover of the vehicle, so that the cable or rope is not visible in the opened position shown in FIG. 3b.

Figure 4:
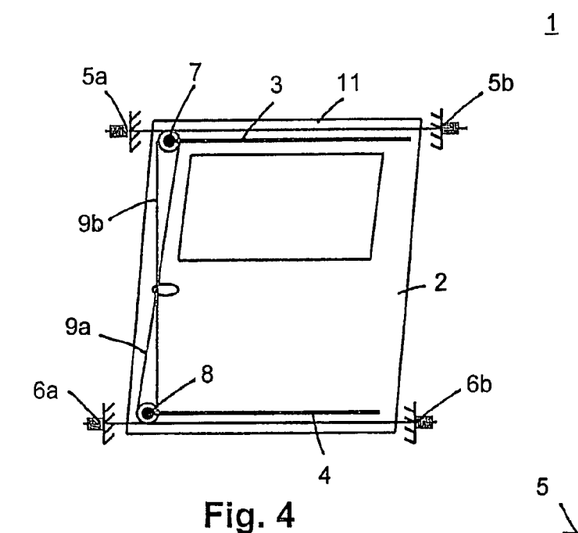
FIG. 4 is a schematic view of a modification of the sliding door according to FIG. 2.

FIG. 4 is a schematic view of a modification of the guide apparatus or assembly according to FIG. 2. Referring to FIG. 4, the guide apparatus or assembly 1 comprises two cables or ropes 9a, 9b that partially run in opposite directions. Starting at the front upper mounting portion 5a the first cable 9a is wound around the upper deflecting pulley 7 clockwise, then extends in a substantially parallel manner towards the left edge of the door 2, is wound around the lower deflecting pulley 8 counterclockwise and runs towards the lower guide rail 4 in a substantially parallel manner towards the rear lower mounting portion 6b. Starting at the rear upper mounting portion 5b, the second cable 9b runs in a substantially parallel manner towards the upper guide rail 3 in the region of the upper edge 11 of the door 2, is wound around the upper deflecting pulley 7 counterclockwise, extends in a substantially parallel manner towards the left edge of the door 2 downwardly in the vertical direction, is wound around the lower deflecting pulley 8 clockwise and extends from there in a substantially parallel manner to the lower guide rail 4 towards the front lower mounting portion 6a. Thus, the cables 9a, 9b are wound around the upper and lower deflecting pulleys 7, 8, respectively, in opposite directions so that identical deflecting pulleys can be utilized for deflecting the cables 9a, 9b when the door 2 is displaced. Of course, in the upper and lower region of the door 2 also respective separate deflecting pulleys may be provided for deflecting the first and second cable 9a, 9b. In the configuration shown in FIG. 4, the first cable 9a and the second cable 9b are guided in a substantially z-shaped manner and laterally reversed or mirror-inverted. The support of the door 2 at the two cables 9a, 9b, which are biased against each other, results in an even more efficient absorption of the moment of tilt resulting from the weight of the door 2.

Figure 5:
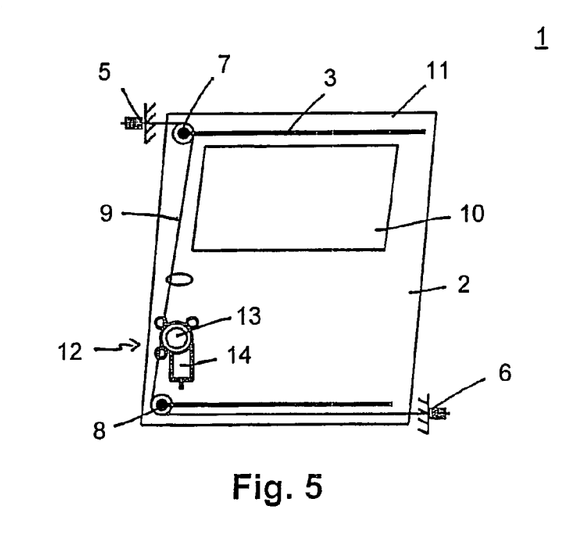
FIG. 5 is a schematic view of a further modification of the sliding door according to FIG. 2.

FIG. 5 is a schematic view of a further modification of the guide apparatus or assembly and of the sliding door according to FIG. 2. As shown in FIG. 5, a drive unit 12 is mounted on the door 2 at the left edge of the door 2. The drive unit 2 is coupled with a cable or rope 9. The drive unit 12 comprises a cable or rope drum 13 and a drive motor 14 and acts on the cable or rope 9, which serves as a traction means, for causing a displacement of the door 2 relative to the vehicle wall. In the illustrated embodiment the drive unit 12 is a drive for a cable or Bowden window regulator so that the cable or rope 9 is wound around the cable drum 13 at least once or so that an end of the cable or rope 9, e.g. a cable nipple, is received in a receptacle of the cable drum 13. A rotary movement of the electric drive motor 14 is transmitted into a rotary movement of the cable drum around a rotary axis, which intersects the drawing plane perpendicularly. During rotary movement of the cable drum 13, the cable 9 or the cable 9' is unwound or wound up, which results in a propulsion of the door 2.

As will become apparent to a person skilled in the art, a drive unit 12 can also engage with a chain, link chain, or bead chain or with traction means of the belt-type or toothed belt-type for causing a propulsion of the door 2.

Figure 6:
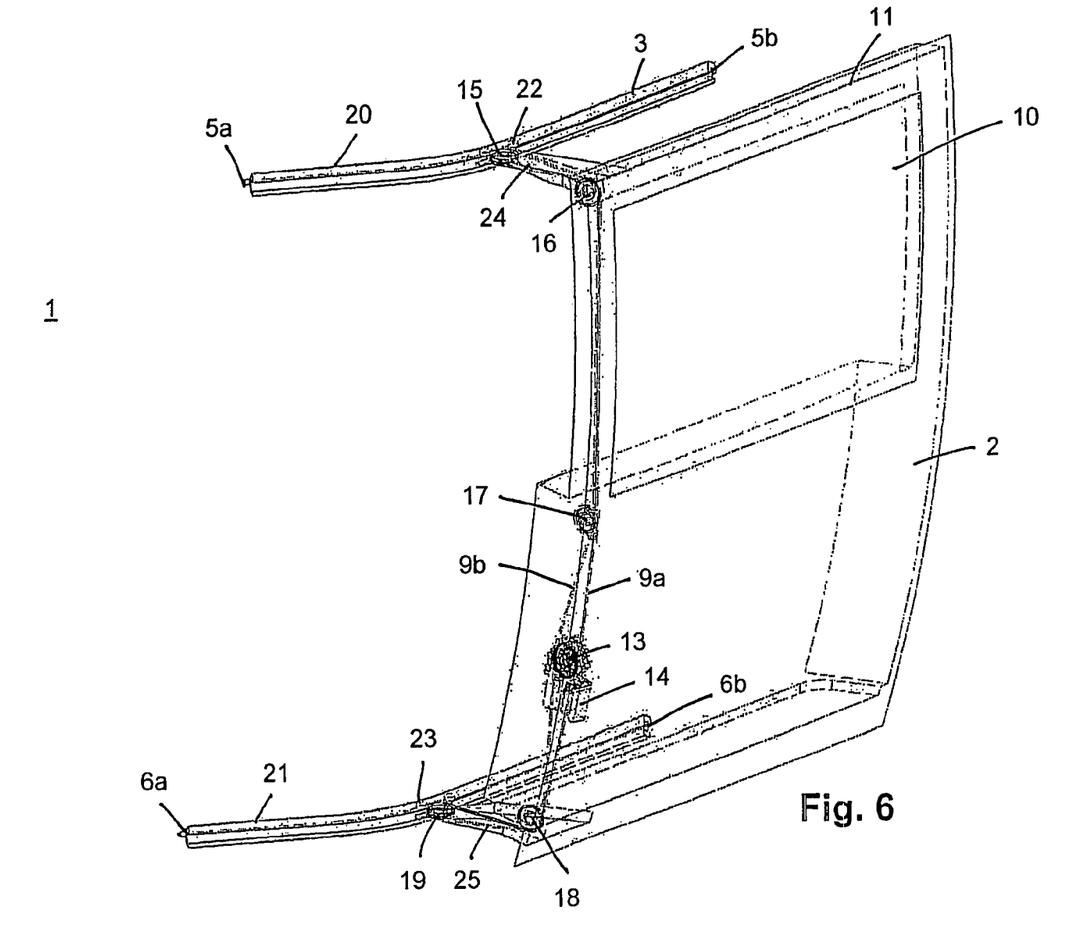
FIG. 6 is a schematic perspective view of the sliding door according to FIG. 5.

FIG. 6 is a schematic perspective view of the guide apparatus or assembly and of the sliding door according to FIG. 5. As shown in FIG. 6, two levers 24, 25, which act as connecting members, are fixedly mounted on the door 2 at the front upper and lower edge of the door 2. The upper and lower levers 24, 25, respectively, extend in a substantially horizontal direction and transverse to the longitudinal axis of the vehicle. At their front ends, the upper and lower levers 24, 25, respectively, support an upper and lower pair of rollers or wheels 22, 23, respectively, in an articulated manner that engage with the upper and lower guide rail 3, 4, respectively, and are guided therein. The upper and lower pair of rollers or wheels 22, 23 is pivotably supported around the vertical axis at the associated levers 24 and 25.

As shown in FIG. 6, the upper guide rail 3 comprises, at its front end, a portion 20, which is curved inwardly towards the vehicle. The lower guide rail 4 comprises, at its front end, a portion 21, which is curved inwardly towards the vehicle. While the door 2 is guided substantially parallel to the exterior wall of the vehicle at the rear end of the guide rails 3, 4, the door 2 is additionally moved towards the vehicle at the front end of the guide rails 3, 4 for closing the door opening, as is known from the prior art.

Referring to FIG. 6, the two cables 9a, 9b act as cable guides that are guided within the door 2, e.g. by being covered by an interior cover of the door, at the left edge of the door 2 in a vertical direction. The two cables 9a, 9b are then guided in a substantially horizontal direction towards the vehicle along the upper and lower lever 24, 25, respectively, and are then guided in opposite directions and in a substantially horizontal direction towards the mounting portions 5, 6 in the configuration according to FIG. 4. According to FIG. 6, the upper and lower guide rails 3, 4 guide not only the pair of rollers or wheels 22, 23 but also the cables or ropes 9a, 9b received therein.

As shown in FIG. 6, the upper lever 24 bears at its front end a deflecting pulley 15, which is rotary movable around a substantially vertical rotary axis and around which the two cables or ropes 9a, 9b are wound in the same directions, as described more in detail with reference to FIG. 4. In the region of the left upper corner of the door 2 an additional deflecting pulley 16 is provided, which is rotary movable around a substantially longitudinal axis of the door 2 and around which the two cables or ropes 9a, 9b are wound around in the same directions. Two deflecting pulleys 18, 19 are also provided at the lower lever 25 in a corresponding manner. An additional deflecting pulley 17 is used for guiding and deflecting the second cable or rope 9b so that two cables 9a, 9b are wound around the cable drum 13 in opposite directions.

As shown in FIG. 6, a third guide rail, which is otherwise disposed between the upper guide rail 3 and the lower guide rail 4 on the exterior wall of the vehicle, as described with reference to FIG. 1, is not provided in the guide apparatus or assembly 1.

Figure 7:
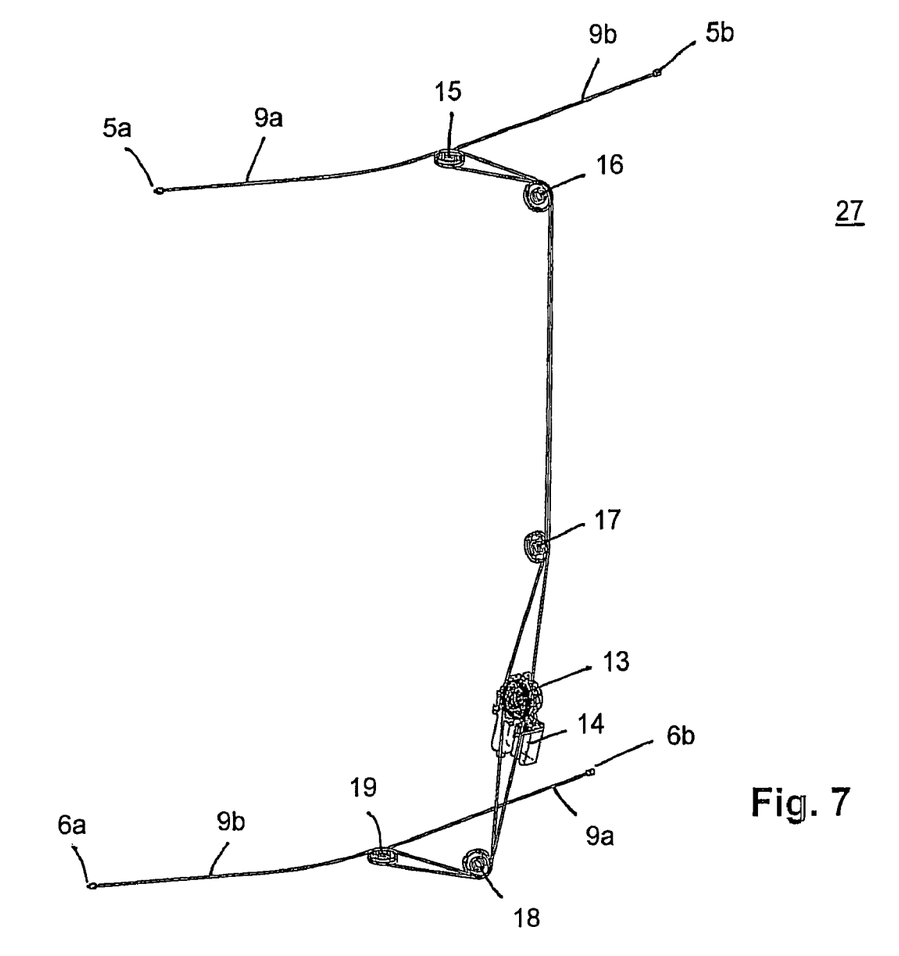
FIG. 7 is a schematic perspective view of the run of the traction cables or ropes according to FIG. 6.

FIG. 7 is a schematic perspective view of the run 27 of the cables according to FIG. 6.

Figure 8:
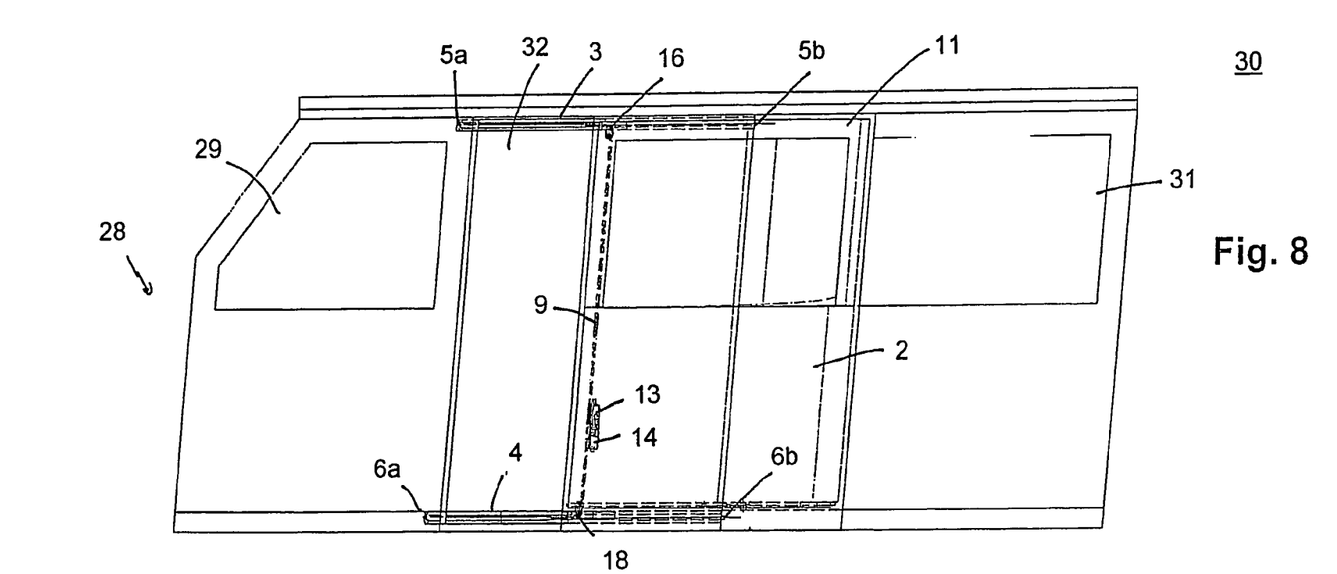
FIG. 8 is a schematic side view of the sliding door according to FIG. 5 in a half-opened position.

FIG. 8 is a schematic side view of the configuration of the door according to FIG. 4 in a motor vehicle. Between the front car body portion 28 comprising a front window 29 and the rear car body portion 30 comprising a rear window there is provided a sliding door 2, which is slidable in the direction of the longitudinal axis of the vehicle, for optionally closing or at least partially opening the door opening 32.

Figure 9:
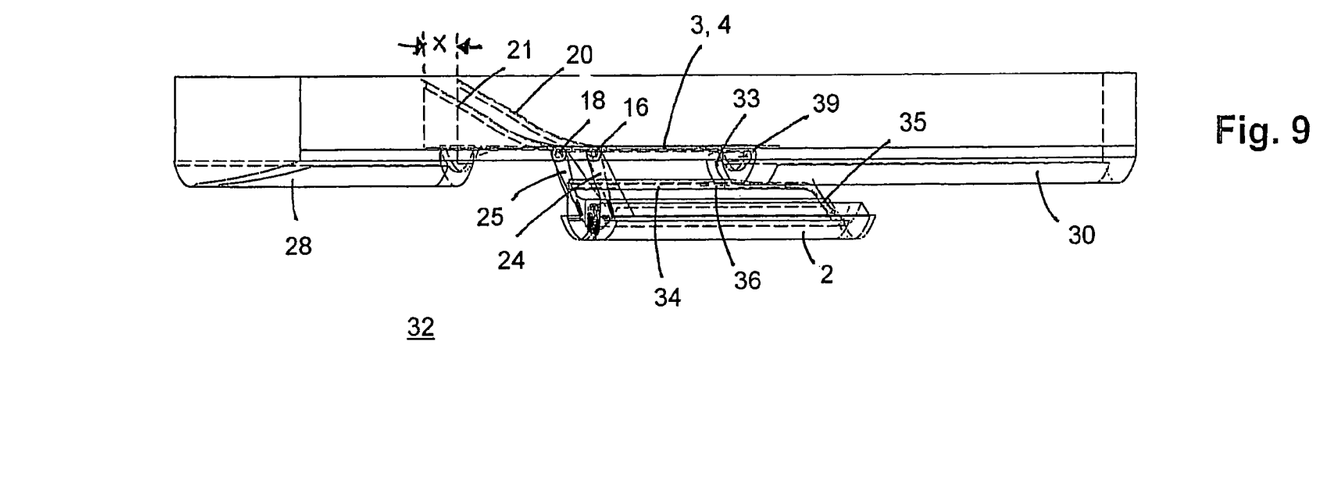
FIG. 9 is a perspective partial cross section of the sliding door according to FIG. 8.

FIG. 9 is a perspective partial cross section of the configuration of the guide rails according to the present invention. In this superimposed drawing both the run of the upper guide rail 3 having the front curved portion 20 and the run of the lower guide rail 4 having the front curved portion 21 are illustrated. As indicated by the arrows, the upper and lower guide rails 3, 4 are displaced relative to each other by a horizontal displacement x. The upper and lower guide rails 3, 4 are mounted on the vehicle wall 28, 29 near the opening or opening 32.

According to FIG. 9 the door 2 is in a half-opened position. Guide rails 34 comprising a rear curved portion 35, which is curved outwardly away from the vehicle, are disposed at the upper and lower edge region of the door 2.

The upper and lower levers 24, 25 are fixedly attached to the door 2, each lever 24, 25 bearing at its front end a pair of rollers or wheels shown in FIG. 6, which engages with the upper and lower guide rail 3, 4, respectively, to be received therein in a displaceable manner. In the half-opened position according to FIG. 9 the pairs of rollers or wheels engage with the transition portion of the upper and lower guide rails 3, 4, respectively, towards the front curved portions 20, 21, respectively.

A respective pivot lever 33 is mounted on the vehicle wall 30 in the region of the rear upper and/or lower corner of the door opening. According to FIG. 9 the pivot lever 33 can be pivoted or swivelled around the rotary axis 39 extending in a substantially vertical direction. At its front end the pivot lever 33 bears a pair 36 of rollers or wheels, which acts as an engaging element, which engages with the guide rail 34 of the sliding door 2 and is received therein slidably. In the half-opened position of the door according to FIG. 9 the pair 36 of rollers or wheels engages with the front portion of the guide rail 34 extending in a substantially linear manner. In this position the distance between the sliding door 2 and the vehicle walls 28, 30 is given by the length of the levers 24, 25 and by the transverse dimensions of the pivot lever 33 so that the sliding door 2 extends substantially parallel to the guide rails 3, 4 and to the vehicle walls 28, 30.

Figure 10:
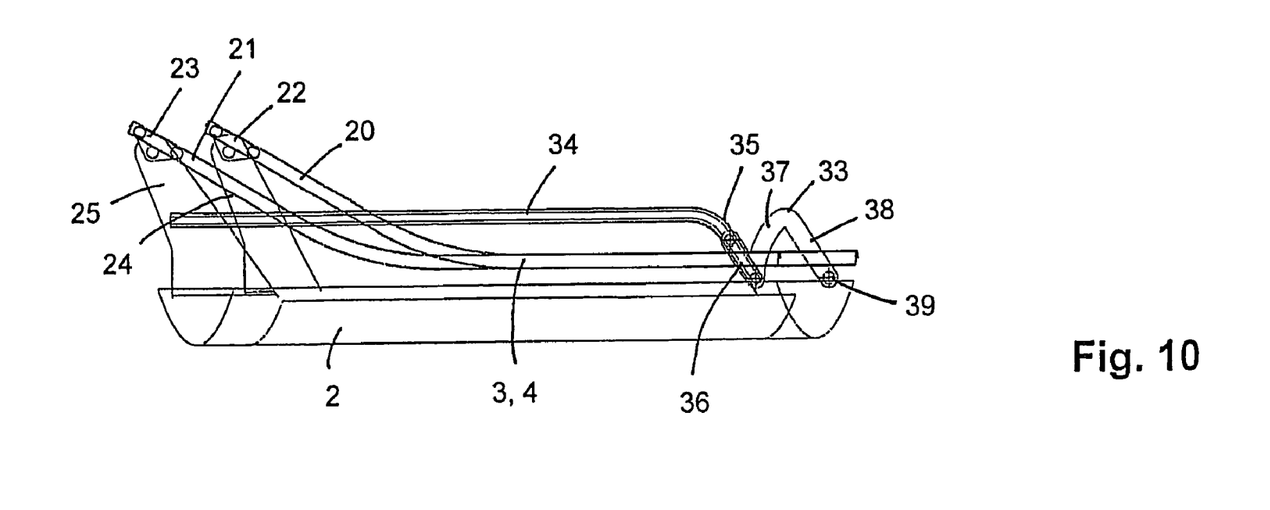
FIG. 10 is a perspective partial cross section of the sliding door according to FIG. 9 in a closed position.

FIG. 10 is a perspective partial cross section of the sliding door 2 according to FIG. 9 in the fully closed position. For transferring the sliding door 2 into the closed position according to FIG. 10 from the half-opened position according to FIG. 9, the sliding door 2 is displaced in the direction of the longitudinal axis of the vehicle so that the pairs 22, 23 of rollers engage with the curved portions 20, 21 of the upper and lower guide rails 3, 4 and so that the pair 36 of rollers engages with the rear curved portion 35 of the guide rail 34 until the pairs 22, 23 and 36 of rollers have reached the respective ends of the guide rails. Due to the engagement of the pairs 22, 23, 36 of rollers with the curved portions 20, 21 and 35, respectively, of the guide rails 3, 4, 34 a swivelling or swinging movement of the door 2 is caused so that the door 2 is swung or swivelled around the rotary axis 39 inwardly towards the vehicle for closing the door opening 32.

Figure 11:
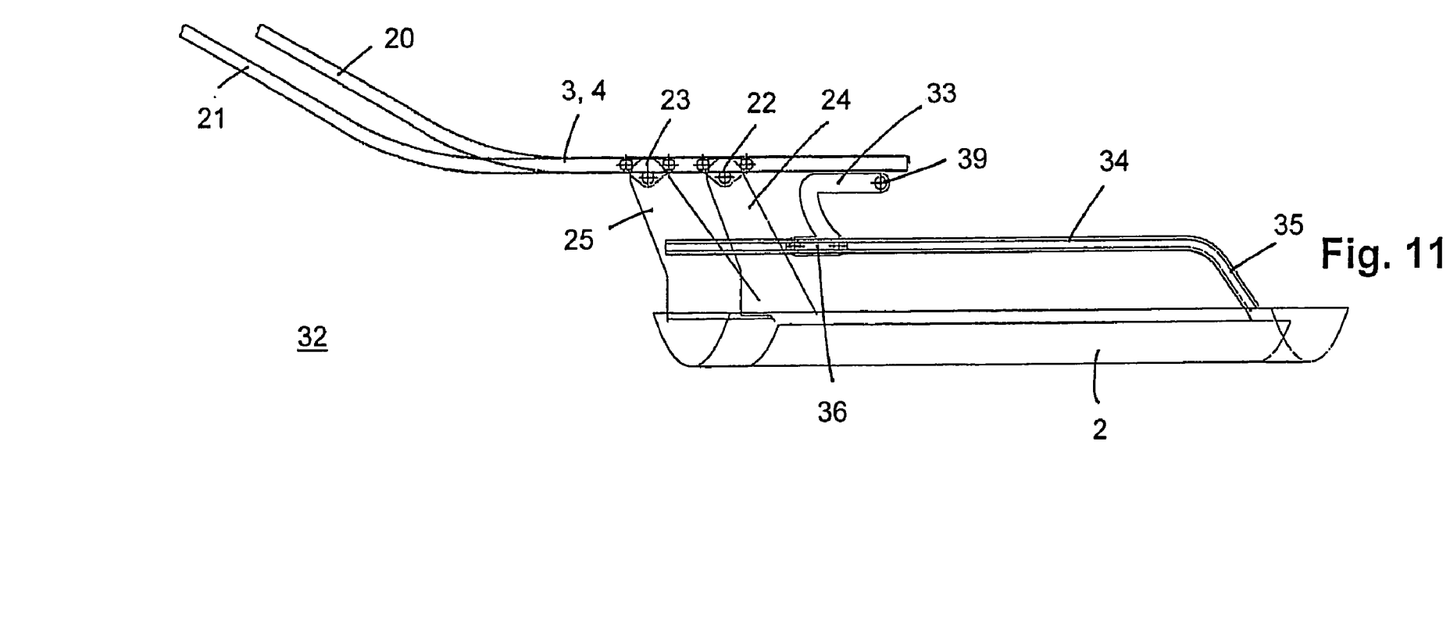
FIG. 11 is a perspective partial cross section of the sliding door according to FIG. 9 in an opened position.

FIG. 11 shows the sliding door 2 according to FIG. 9 in the fully opened position, wherein all pairs 22, 23, 36 of rollers engage with those portions of the guide rails 3, 4, 34 that extend linearly along the longitudinal axis of the vehicle.

As will become apparent to a person skilled in the art from the above description, according to the present invention a guide and drive principle for sliding doors or pivotable sliding doors is implemented that works without the conventional three-point guide according to FIG. 1. Thus, according to the present invention the spoiling third guide rail 100 shown in FIG. 1, which is disposed on the exterior wall of the vehicle, is not necessary anymore, which enables new possibilities in the design of motor vehicles. The guide and drive principle according to the present invention is particularly preferred in applications with sliding doors or pivotable sliding doors for automobiles, vans or similar small vehicles.

In general, however, it cannot be excluded that in addition to the above-mentioned guide rails 3, 4 and 34 one or more additional guide rails are provided, e.g. an additional guide rail in the area of the interior side of the door, engaging with an engaging element, e.g. a guide pin, which is disposed on the exterior wall of the vehicle, e.g. near the edge region of the door opening, serving as a guide or the like.

According to the present invention, also a drive unit with an electric motor for opening the sliding door can be integrated into the door itself or into a door module to be mounted on the door. Thus, according to the present invention powered doors or powered door modules having a drive unit with an electric motor integrated therein can be assembled completely in advance and can be supplied, which feature helps to reduce the efforts during assembly planning. The door or the door module to be received can be provided at a substantially unchanged run of the traction cables with a drive unit so that according to the present invention sliding doors or pivotable sliding doors can be implemented either to be actuated manually or electrically, as desired.

As will become apparent to a person skilled in the art when studying the above description, various modifications and changes can be performed without departing from the spirit of invention or the extent of protection of the accompanying claims. Therefore such modifications and changes are to be covered by the present invention.

The present application claims priority of German patent application no. 103 39 347.1 filed Aug. 25, 2003, the whole contents of which is hereby incorporated by reference.

What is claimed is:

1. A guide assembly for a sliding door or a pivotable sliding door of a vehicle having at least one door displaceably supported at the vehicle by means of connecting members disposed vertically above each other, comprising:
   upper guide means and lower guide means, each cooperating with a respective connecting member at least during displacement of the door;
   two traction means, which are flexible, extend at least partially into opposite directions and are biased to each other; and
   at least an upper and a lower deflecting means to be mounted on the door, each engaging with one of said traction means for deflecting said traction means; wherein each of said two traction means can be mounted on a vehicle wall by means of upper and lower traction means holding portions, wherein each traction means holding portion can be mounted on said vehicle wall;
   the upper and lower deflecting means deflect a respective one of said traction means in opposite directions and can be mounted to the door in proximity to the upper and lower front corner respectively of the door; and
   the upper and lower deflecting means engage with said respective one of said traction means such that said respective one of said traction means is guided in a substantially z-shaped manner at least in an opened or closed position of the door.

2. The guide assembly of claim 1, wherein said traction means with ends opposite to each other can be mounted at the vehicle wall at traction means holding portions, wherein said traction means holding portions are displaced relative to each other in a vertical direction and wherein said traction means holding portions are displaced relative to each other in a horizontal direction by at least a displacement distance of said door.

3. The guide assembly of claim 1, wherein the upper deflecting means is disposed horizontally behind the lower deflecting means.

4. The guide assembly of claim 1, wherein each of said upper and lower deflecting means comprises a receptacle, which is formed as to correspond to a profile of said one of said traction means, for receiving said at least one traction means therein.

5. The guide assembly of claim 1, wherein the upper and lower deflecting means is each formed as a pair of deflecting members for guiding said one of said traction means along said respective connecting member.

6. The guide assembly of claim 1, wherein the connecting members comprise an articulated joint for joining the door with the vehicle wall.

7. The guide assembly of claim 6, wherein the connecting members are levers bearing an articulated engaging member for engaging with the upper and lower guide means, respectively, at an end turned away from the door.

8. The guide assembly of claim 1, wherein the upper and lower guide means are respectively formed as guide rails to be mounted on the vehicle wall, each comprising a curved portion at an end thereof.

9. The guide assembly of claim 8, wherein the upper and lower guide means further comprise an upper and a lower guide rail to be mounted on the door, each comprising a curved portion at an end thereof.

10. The guide assembly of claim 9, further comprising an upper and a lower pivot lever, each to be mounted pivotably on the vehicle wall and each bearing an engaging member to be received slidably in the upper and lower guide rail, respectively, which is to be mounted on the door.

11. The guide assembly of claim 1, wherein at least one of said traction means is coupled with a drive unit for causing a relative displacement of the door relative to the vehicle wall, wherein said drive unit can be mounted to the door.

12. The guide assembly of claim 11, wherein the drive unit comprises a cable drum, said at least one of said traction means being wound around said cable drum.

13. A sliding door of a vehicle, being displaceably supported at the vehicle by means of connecting members disposed vertically above each other and comprising a guide assembly for guiding said sliding door, said guide assembly comprising:

upper guide means and lower guide means, each cooperating with a respective connecting member at least during displacement of the door;

two traction means, which are flexible, extend at least partially into opposite directions and are biased to each other; and at least an upper and a lower deflecting means to be mounted on the door, each engaging with one of said traction means for deflecting said traction means; wherein each of said two traction means can be mounted on a vehicle wall by means of upper and lower traction means holding portions, wherein each traction means holding portion can be mounted on said vehicle wall;

the upper and lower deflecting means deflect a respective one of said traction means in opposite directions and can be mounted to the door the upper and lower front corner respectively of the door; and the upper and lower deflecting means engage with said respective one of said traction means such that said respective one of said traction means is guided in a substantially z-shaped manner at least in an opened or closed position of the door.

14. The sliding door of claim 13, further comprising a drive unit mounted on said sliding door for driving said at least one traction means and for displacing said sliding door relative to a vehicle wall, wherein the drive unit comprises a cable drum, said at least one traction means being wound around said cable drum.

15. The sliding door of claim 13, wherein the upper and lower deflecting means deflect said at least one traction means in opposite directions, said upper and lower deflecting means being mountable to the door at an end thereof and wherein the deflecting means engage with said at least one traction means such that the respective traction means is guided in a substantially z-shaped manner at least in an opened or closed position of the door.

* * * * *

UNITED STATES PATENT AND TRADEMARK OFFICE
CERTIFICATE OF CORRECTION

| | | |
|---|---|---|
| PATENT NO. | : 7,337,581 B2 | Page 1 of 1 |
| APPLICATION NO. | : 10/925124 | |
| DATED | : March 4, 2008 | |
| INVENTOR(S) | : Kriese | |

It is certified that error appears in the above-identified patent and that said Letters Patent is hereby corrected as shown below:

Column 13, lines 17-18, replace "the upper and lower front corner respectively of the door" with --in proximity to the vehicle wall--.

Signed and Sealed this

Twenty-fourth Day of June, 2008

JON W. DUDAS
*Director of the United States Patent and Trademark Office*